United States Patent [19]

Jackson et al.

[11] Patent Number: 5,296,146
[45] Date of Patent: Mar. 22, 1994

[54] METHOD FOR REMOVAL OF EXPLOSIVES FROM AQUEOUS SOLUTION USING SUSPENDED PLANT CELLS

[75] Inventors: Paul J. Jackson, Los Alamos; Agapito P. Torres, deceased, late of Los Alamos, both of N. Mex., by Joy M. Torres, executrix; Emmanuel Delhaize, Giralang, Australia

[73] Assignees: The Regents of the University of CA; Los Alamos National Laboratory, Los Alamos, N. Mex.

[21] Appl. No.: 895,306

[22] Filed: Jun. 8, 1992

Related U.S. Application Data

[62] Division of Ser. No. 530,765, May 30, 1990, Pat. No. 5,120,441.

[51] Int. Cl.[5] .................................. C02F 3/32
[52] U.S. Cl. ...................... 210/602; 210/611; 210/903; 210/909
[58] Field of Search ............... 210/601, 602, 610, 611, 210/691, 903, 908, 909

[56] References Cited

U.S. PATENT DOCUMENTS

| | | | |
|---|---|---|---|
| 3,660,278 | 5/1972 | Mimura et al. | 210/611 |
| 4,043,936 | 8/1977 | Francis et al. | 210/610 |
| 4,225,430 | 9/1980 | Bosman | 210/610 |

OTHER PUBLICATIONS

P. J. Jackson et al., "Poly(γ-glutamylcysteinyl)glycine: Its Role in Cadmium Resistance in Plant Cells", Proc. Natl. Acad. Sci. USA, 84, 6619 (1987).

C. D. Foy, R. L. Chaney, and M. C. White, "The Physiology of Metal Toxicity in Plants", Ann. Rev. Plant Physiol., 29, 511 (1978).

J. S. Fletcher, A. W. Groeger, and J. C. McFarlane, "Metabolism of 2-chlorobiphenyl by Suspension Cultures in Paul's Scarlet Rose", Bull. Environ. Contam. Toxicol., 39, 960 (1987).

P. J. Jackson, E. J. Roth, P. McClure, and C. M. Naranjo, "Selection, Isolation, and Characterization of Cadmium-Resistant *Datura innoxia* Suspension Cultures", Plant Physiol., 75, 914 (1984).

*Primary Examiner*—Thomas Wyse
*Attorney, Agent, or Firm*—Samuel M. Freund

[57] ABSTRACT

The use of plant suspension cultures to remove ionic metallic species and TNT-based explosives and their oxidation products from aqueous solution is described. Several plant strains were investigated including *D. innoxia*, Citrus citrus, and Black Mexican Sweet Corn. All showed significant ability to remove metal ions. Ions removed to sub-ppm levels include barium, iron, and plutonium. *D. innoxia* cells growing in media containing weapons effluent contaminated with $Ba^{2+}$ also remove TNT, other explosives and oxidation products thereof from solution. The use of dead, dehydrated cells was also found to be of use in treating waste directly.

3 Claims, 6 Drawing Sheets

METHOD FOR REMOVAL OF EXPLOSIVES FROM AQUEOUS SOLUTION USING SUSPENDED PLANT CELLS

This is a divisional of copending application(s) Ser. No. 07/530,765 filed on May 30, 1990 now U.S. Pat. No. 5,120,441.

This invention is the result of Contract No. W-7405-ENG-36 between the Regents of the University of California and the U.S. Department of Energy.

BACKGROUND OF THE INVENTION

The present invention relates generally to water purification, and more particularly to the use of plant cells in suspension to remove metal atoms and explosives from aqueous solution.

Barium ion ($Ba^{2+}$) has been used extensively in the production of conventional explosives in the explosive formulation Baratol, a 2,4,6-trinitrotoluene-based (TNT-based), castable mixture which consists of 76% (w/w) barium nitrate ground to a specific particle size and 24% TNT. Explosives are routinely machined underwater, resulting in the contamination of the aqueous solution with $Ba^{2+}$ and TNT.

Four families of high-temperature superconducting ceramic oxides are currently being investigated. Three of these families contain significant amounts of $Ba^{2+}$. The environmental impact of the production of such materials on a large scale will likely include the production of effluent containing high concentrations of barium and other toxic metal ions.

Barium is toxic to humans and to other species and must be removed prior to environmental discharge of effluents from production facilities. Environmental Protection Agency standards presently require the removal of this ion to concentrations below 100 ppm. New guidelines may require that substantially less $Ba^{2+}$ can be released. Current methods for barium removal include the conversion of barium nitrate into less soluble barium sulfate which can be precipitated from effluent waters prior to their release. The resulting precipitate is subsequently buried. The overall process is relatively expensive and some barium is still released into the environment.

TNT, oxidation products thereof, and other soluble explosive materials are also found in these effluent waters. Most of these compounds are similarly toxic and must be reduced to environmentally acceptable levels before the water may be released. Current technology requires the step-wise removal of $Ba^{2+}$ followed by the removal of these explosive compounds with activated charcoal and incineration of the charcoal. A simpler, more efficient process, and one which also removes other toxic materials from the effluent, is needed for the processing of large amounts of effluent prior to environmental discharge.

Remediation of water-borne plutonium and other actinide elements is likewise a well-known problem for the nuclear power industry and for the nuclear weapons complex. Simple, inexpensive, and efficient removal procedures are actively being sought to enable these industries to comply with increasingly stringent environmental regulations and with public concerns.

Plant cell suspension cultures can be selected for growth in concentrations of certain metal ions which are toxic to many other species. Survival may result from the production of small, metal-binding polypeptides which tightly bind all of the toxic ions entering the cells. See, e.g., P. J. Jackson, C. J. Unkefer, J. A. Watt, and N. J. Robinson, "Poly(γ-glutamylcysteinyl)glycine: Its Role In Cadmium Resistance In Plant Cells," Proc. Natl. Acad. Sci. U.S.A. 84, 6619 (1987). Alternatively, tolerance may be associated with the ability to exclude the metal ions from the cells. See, e.g., C. D. Foy, R. L. Chaney, and M. C. White, "The Physiology of Metal Toxicity In Plants," Annu. Rev. Plant Physiol. 29, 511 (1978). The latter reference describes the uptake of metals by whole plants and suggests a role of whole plants in environmental cleanup and stabilization of contaminated sites, but no parallel action has been observed or predicted for plant cell cultures. Certain plants are already being used to stabilize sites contaminated with toxic trace metal ions (See, e.g., R. R. Gemmel, "Colonization of Industrial Wasteland" (Arnold Publishing Company, London, 1977)).

Fletcher et al. have demonstrated in "Metabolism of 2-chlorobiphenyl by Suspension Cultures of Paul's Scarlet Rose," by J. S. Fletcher, A. W. Groeger, and J. C. McFarlane, Bull. Environ. Contam. Toxicol. 39, 960 (1987) that suspension cultures of Rose remove PCBs from solution and chemically modify them.

Accordingly, it is an object of the present invention to substantially reduce the concentration of chosen metal ions from aqueous solution.

Another object of my invention is to substantially reduce the concentration of TNT in aqueous solution.

Yet another object of the invention is to substantially reduce the concentration of other explosives and explosive oxidation products in aqueous solution.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method hereof may include mixing an aqueous solution of a target metal ion and/or explosives to be removed therefrom with a suspension of plant cells, and separating the plant cells from the liquid after a sufficient interaction time has occurred. Preferably, the plant cells comprise Datura innoxia (D. innoxia). It is also preferred that the plant cells have been selected for growth in concentrations of the target metal ion and/or explosive.

Benefits and advantages of the present invention include efficient and economical removal of toxic and radioactive metals and harmful explosives and their oxidation products from aqueous solution using abundant, readily generated, and available plant cells.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

Figure 1:
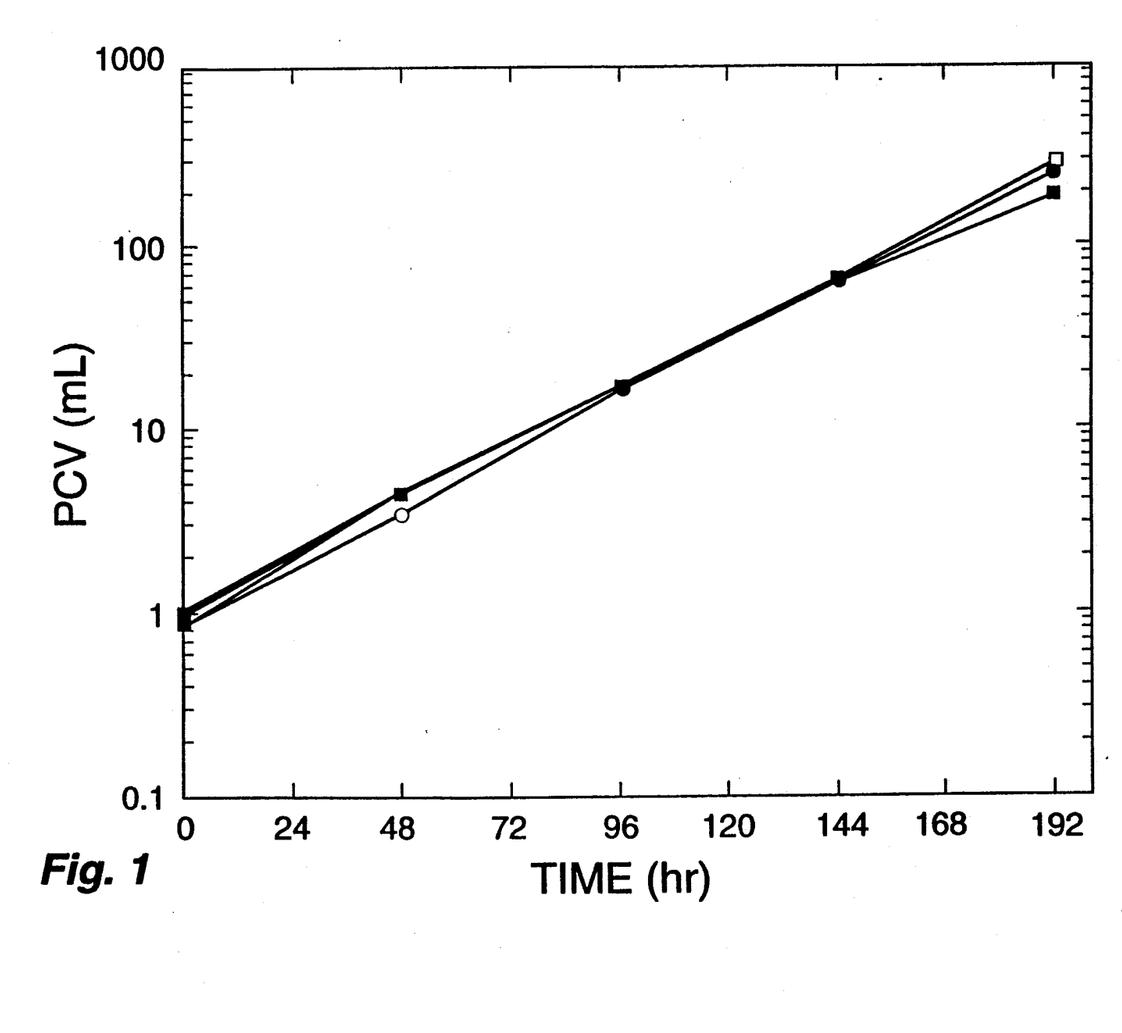
FIG. 1 graphically illustrates the growth of D. innoxia cells in aqueous suspensions containing concentrations of $Ba^{2+}$ ranging from 0 to 1,000 μM of $Ba(NO_3)_2$. Close overlap of the curves prevents detailed identification and separation of the five concentrations investigated.

A. Growth of *D. innoxia* cells in different concentrations of $Ba^{2+}$. In order to determine what concentrations of $Ba^{2+}$ are toxic to cell suspension cultures of *D. innoxia*, exponentially growing cells were exposed to different concentrations of this ion. Turning now to the figures, FIG. 1 illustrates the growth of *D. innoxia* cells in different concentrations of $Ba^{2+}$ for different periods. Rapidly growing *D. innoxia* cell suspension cultures were transferred to fresh media containing 0, 100, 250, 500 and 1,000 μM $Ba(NO_3)_2$. Measurements of cell growth were determined by measuring the packed-cell volume (PCV) of 5 ml of culture at different times after addition of $Ba^{2+}$. Cells were transferred to fresh media containing the original concentration of $Ba^{2+}$ every 48 hours to maintain rapid cell division. Clearly, there is no significant difference in the doubling time and cell volume of cells growing in any concentration of $Ba^{2+}$ up to 2 mM. Above this concentration, the metal ion was found to precipitate from solution. However, if cells are grown in media containing precipitated $Ba^{2+}$, the precipitate vanishes after two days, suggesting that removal of the soluble ion by the cells shifts the equilibrium resulting in the solubilization of the precipitated barium. Growth of cells for extended periods in 1 or 2 Mm $Ba(NO_3)_2$ does not inhibit cell growth and division. Cultures growing in these concentrations for over 350 generations show no change in cell doubling times when compared to the same cells growing in the absence of this $Ba^{2+}$.

Figure 2:
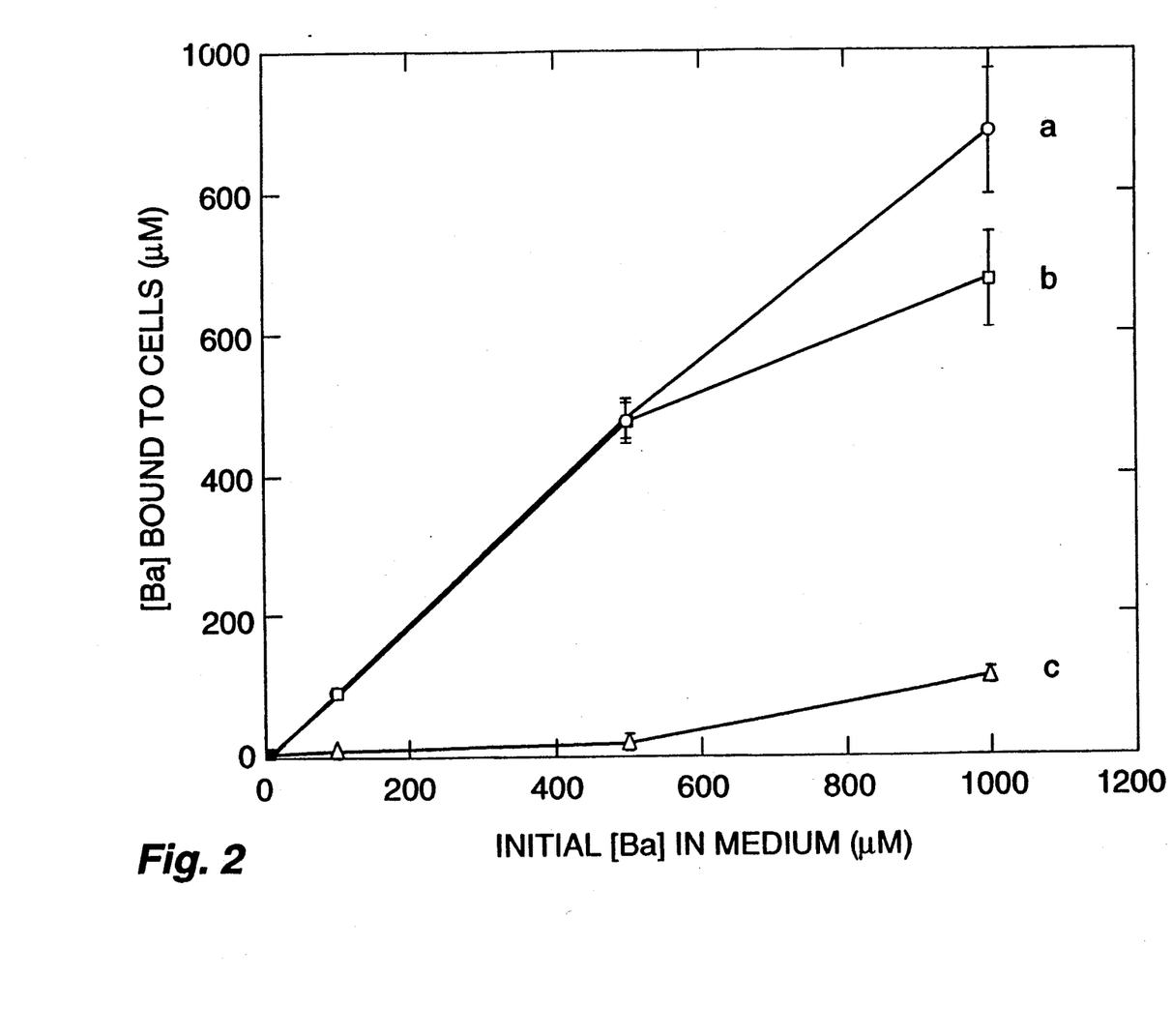
FIG. 2 graphically illustrates the removal of $Ba^{2+}$ from aqueous solution by rapidly growing *D. innoxia* cell suspension cultures grown in media containing different initial concentrations of $Ba(NO_3)_2$.

B. Removal of $Ba^{2+}$ from cell growth medium. In order to measure uptake of $Ba^{2+}$ into cells, cultures containing $2 \times 10^6$ cells/ml and growing in media containing no additional barium were transferred to media containing different concentrations of $Ba(NO_3)_2 + 0.1$ μCi/ml carrier-free $^{133}Ba(NO_3)_2$ and allowed to grow for 24 hours. During this period, the cell number approximately doubles. Cells were then collected from the medium by centrifugation, washed twice and homogenized. The medium, total homogenate and supernatant following removal of insoluble material were then assayed for radioactivity. FIG. 2 shows the distribution of $Ba^{2+}$ among the different fractions after removal by the growing *D. innoxia* cells. Values are plotted against the total amount of $Ba(NO_3)_2$ initially present in the media.

FIG. 2a shows the barium bound to the cells, FIG. 2b that barium bound to the insoluble component, and FIG. 2c barium remaining in the medium. Almost 90% of the $Ba^{2+}$ ion is associated with the cells following growth in 1 mM $Ba^{2+}$. Virtually all of the metal ion associated with the cells is bound to a component of the insoluble cell homogenate. These results suggest that the cells are able to sequester large amounts of $Ba^{2+}$. They also suggest that either the metal binding is rather weak or the number of potential binding sites is close to saturation when cells have been grown in 1 Mm $Ba^{2+}$. The fact that this concentration of barium does not appear to be toxic to the cells suggests that the latter is probably correct. A very large portion of $Ba^{2+}$ is removed by the cells in media containing up to 500 μM $Ba^{2+}$. Above this concentration, significant amounts of $Ba^{2+}$ remain in the media. Removal of cells containing $Ba^{2+}$ followed by addition of new cells results in the decrease of the barium ion in solution to about the same percentage of removal. Successive treatments result in the barium ion falling to below the detectable limit of 1 ppb. This behavior suggests a saturation of all of the Ba-binding sites within the first set of cells. The results demonstrate a tight binding of $Ba^{2+}$ to an insoluble fraction of the cells.

Figure 3:
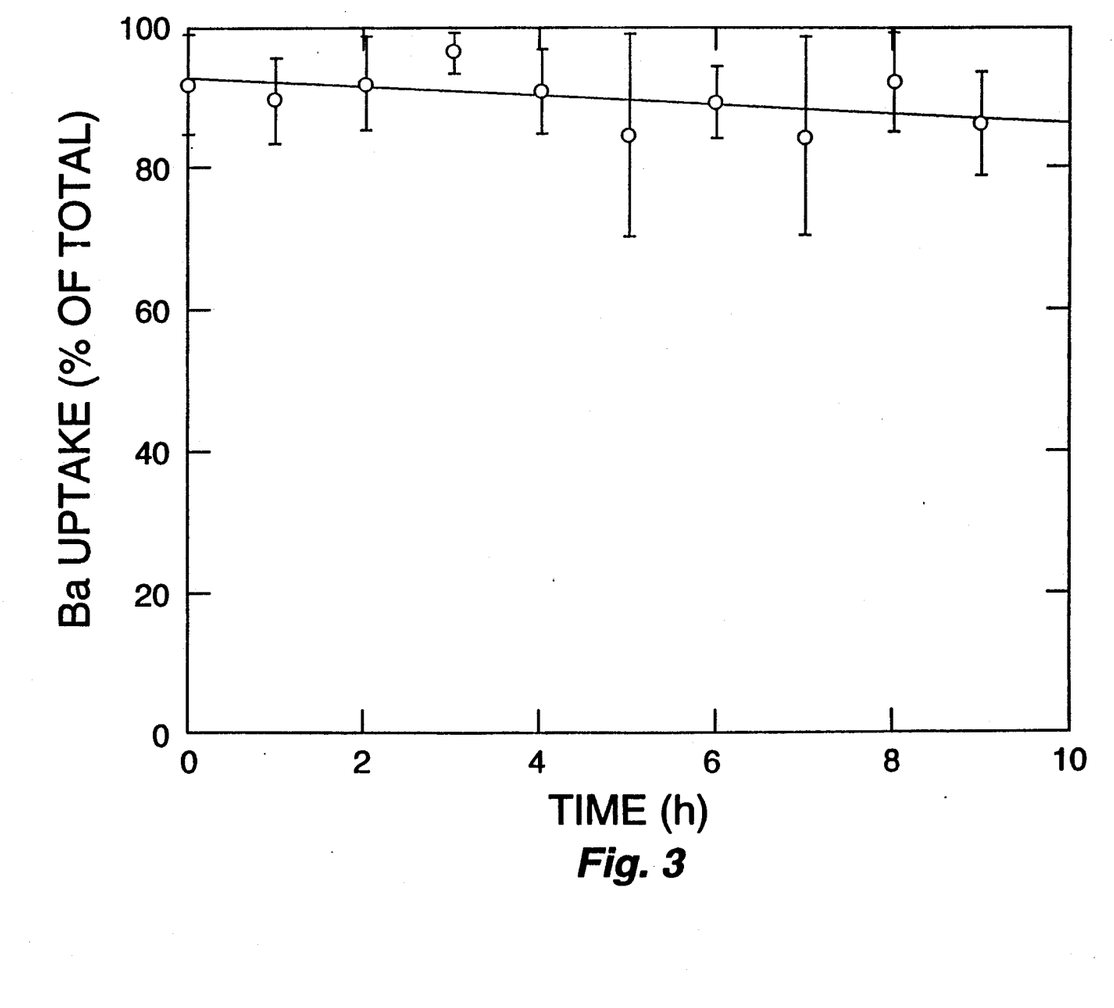
FIG. 3 graphically illustrates the rate of uptake of $Ba^{2+}$ with time by *D. innoxia* cells.

C. Identification of the cellular component binding $Ba^{2+}$. Measurements of the rate of uptake of $B^{2+}$ are shown in FIG. 3. *D. innoxia* cells were placed into media containing 1 mM $Ba(NO_3)_2$ plus carrier-free $^{133}Ba$ for different periods of time. Cells were then removed from the media by centrifugation and the media and cell homogenate assayed for $^{133}Ba$ activity. The results demonstrate an almost immediate interaction of soluble $Ba^{2+}$ with some component of the cells. The rapid nature of this interaction suggests that the metal ion is not passing through cellular membranes. The data therefore strongly suggest that the $Ba^{2+}$ is binding to some external component of the cells, perhaps a component of the cell wall or membrane. *D. innoxia* cells growing in the absence of $Ba^{2+}$ were transferred to media containing 500 μM $Ba(NO_2)_2$ plus 0.2 μCi/ml $^{133}Ba^{2+}$ and grown an additional 24 hours. Cells were then converted to protoplasts. Within two hours, 95% of the cell population was converted as the walls were digested. At different times following exposure to the enzymes, samples were collected, filtered through 45 micron screens, washed protoplasts were collected from suspension by centrifugation for 3 minutes at 200 g, and the total amount of barium assayed. Protoplasts will pass through such a sieve, while cells and cell clumps cannot. Measurement of the total amount of barium found in the cells and protoplasts demonstrated a loss of $Ba^{2+}$-binding by protoplasts. Please refer to Table 1. Data presented are from four independent experiments. The remaining 5% of the cells bound over two-thirds of the $Ba^{2+}$ present. These results suggest that some component of the cell wall is involved in $Ba^{2+}$-binding. Addition of purified cellulose to media containing $Ba^{2+}$, however, did not result in the rapid removal of this ion from solution (data not shown), suggesting that some other factor within the wall is responsible for metal binding.

TABLE 1

Association of $Ba^{2+}$ with plant cells and plant protoplasts.

| | % of total $Ba^{2+}$ associated with | | |
|---|---|---|---|
| Exp. No. | Cells | Media | Protoplasts |
| 1 | 68.7 | 24.2 | 7.1 |
| 2 | 71.6 | 21.5 | 6.9 |
| 3 | 63.6 | 20.6 | 15.8 |
| 4 | 68.7 | 26.8 | 4.5 |

Figure 4:
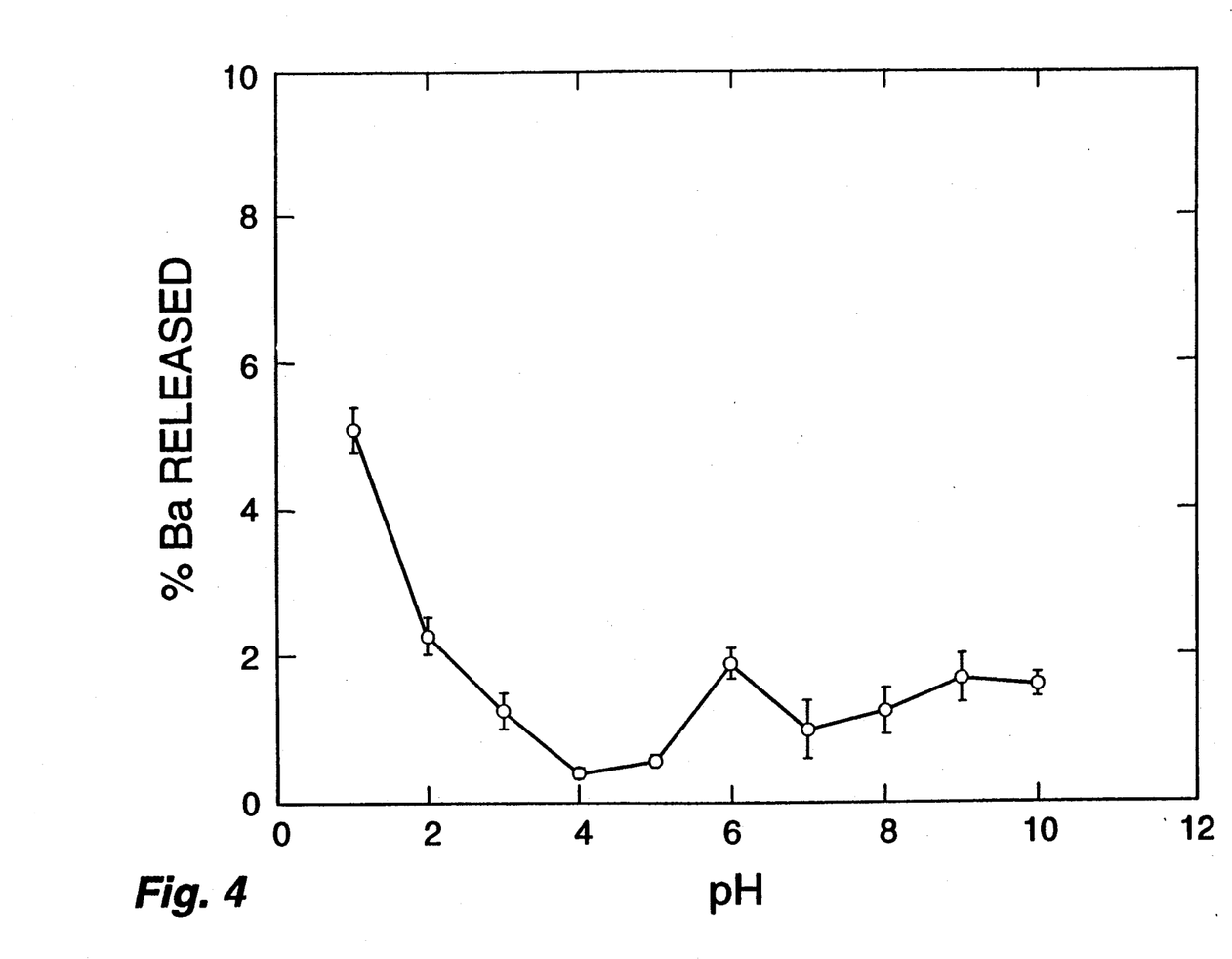
FIG. 4 graphically illustrates the stability of metal-binding of extracts of *D. inno amounts of $Ba^{2+}$. Greater than 5% of the dry weight of cells grown in high concentrations of $Ba(NO_3)_2$ is $Ba^{2+}$.

D. Stability of Ba-binding. In order to further characterize the binding component(s) and to determine the stability of metal binding under different conditions, the effect of pH on metal binding was determined. Ten ml samples of cells grown in 1 mM $Ba^{2+}$ plus 0.1 μCi/ml carrier-free $^{133}Ba$ for 24 hours were collected and extracted after being washed twice with media containing no additional $Ba^{2+}$, and each extract was adjusted to a different pH. Samples were then incubated overnight at 22° C. The resulting samples were centrifuged to separate the aqueous from the insoluble phases, and the supernatant was assayed for $^{133}Ba$ content. FIG. 4 demonstrates that metal binding is quite stable over a pH range from 1 to 10. These results suggest that binding is quite complex, since ionic binding to a single, simple entity would result in the loss of affinity of the binding site for the metal ion upon a change in pH around the pKa of such a specific site.

Figure 5:
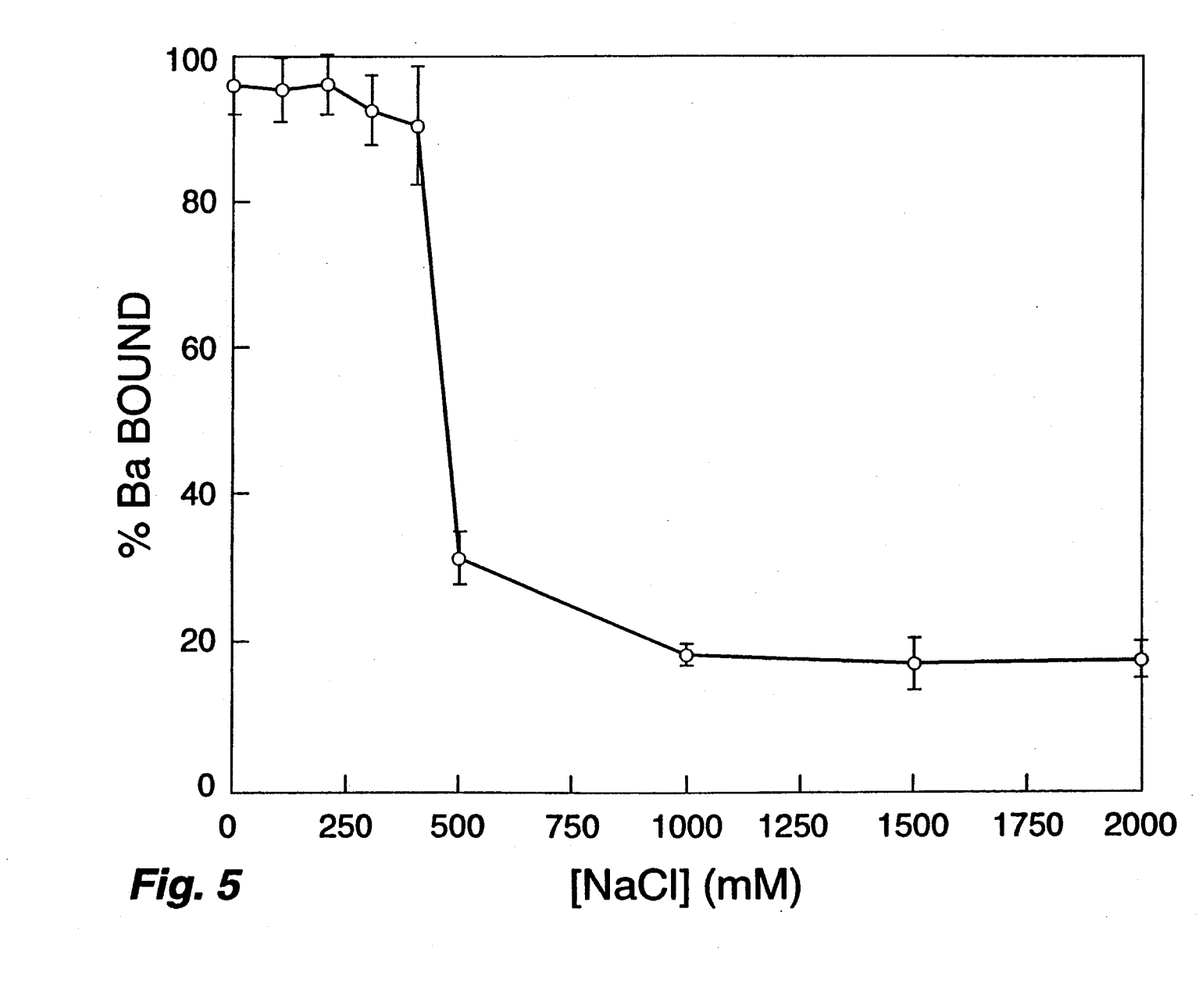

Extractions containing different concentrations of $Na^+$ were found to demonstrate relative stability to different salt concentrations. However, at higher concentrations. Ba binding is lost. This demonstrates that the interaction between this metal ion and the cellular component is ionic in nature. This is illustrated in FIG. 5 which shows the binding of barium by cell components at different $Na^+$ concentrations. *D. innoxia* cells were grown to $4 \times 10^6$ cells per ml, then transferred to solutions containing 500 μM $Ba(NO_3)_2$, 0.1 μCi/ml carrier-free $^{133}Ba$ and different concentrations of NaCl. Suspensions were mixed for 24 hours, then separated by centrifugation. Cell pellets were washed in buffer containing the same concentration of $Na^+$ ion, then extracted.

E. Removal of $Ba^{2+}$ from complex waste solutions. If plant cells are to offer an alternative to current technology for the removal of $Ba^{2+}$ solutions, binding of this ion by cells under the conditions found within such solutions must be demonstrated. Samples of such waste were therefore obtained and assays of $Ba^{2+}$ and other components were performed. The amount of $Ba^{2+}$ bound by the cells varied according to the original amount present in the waste sample tested. The "percent dry weight" equals weight of bound $Ba^{2+}$ divided by the total weight of the cells and $Ba^{2+}$. Two-day old suspension cultures of *D. innoxia* ($8 \times 10^6$ cells/ml) were collected by centrifugation. One-half of the cells were washed twice with 70% ethanol, then dehydrated by heating at 42° C. Living cells and dehydrated samples were then resuspended in 50 ml of filter-sterilized waste solution containing known amounts of $Ba(NO_3)_2$ plus 0.1 μCi/ml carrier-free $^{133}Ba$. Suspensions were incubated with shaking at 22° C. overnight, then collected from the waste by centrifugation. The amount of barium attached to the cells and left in the waste was measured. The amount of barium found in the different fractions of an extract of the living cells was also determined. Table 2 demonstrates the removal of radioactive $Ba^{2+}$ from waste solutions. This information was confirmed by an independent assay of $Ba^{2+}$ within the samples (data not shown). Addition of dead, dehydrated cells to waste also resulted in removal of $Ba^{2+}$ from solution. Measurement of radioactivity and dry weights following removal of $Ba^{2+}$ from solution demonstrated that as much as 5.3% of the dry weight of the cells is barium following exposure to waste containing this metal ion.

TABLE 2

Removal of $Ba^{2+}$ from waste solutions by living and dehydrated plant suspension culture cells.

|  | Living Cells | Dehydrated Cells |
|---|---|---|
| Associated with cells (%): | 93.75 (±5.25) | 96.10 (±5.86) |
| $Ba^{2+}$ remaining in waste solution (%): | 6.25 (±0.35) | 5.9 (±0.36) |
| Insoluble portion of cell extract: | 90.10 (±2.47) | not measured |
| Soluble portion of cell extract: | 2.65 (±0.07) | not measured |
| Percent dry weight: | not measured | 2.8–5.3* |

*The amount of $Ba^{2+}$ bound by the cells varied according to the original amount present in the waste sample tested. Percent of dry weight equals weight of bound $Ba^{2+}$ divided by the total weight of the cells and $Ba^{2+}$ multiplied by 100

EXAMPLE II

Plutonium Removal

The experiment for binding Pu is very similar to that for binding Ba. The major difference is that Pu(IV) is readily hydrolyzed to give polymeric material at acid concentrations below 0.1N and therefore complexing agents are needed in the aqueous solution to maintain the Pu(IV) in soluble form in the pH 1–10 range. A wide range of pH representative of environmental conditions and some process waste streams as well as the competitive binding of the Pu(IV) by the very strong chelators citrate and EDTA were examined. The test solutions were "spiked" with a small amount of Pu(IV) in HCl to give the solutions shown in Table 3. A volume of packed cells (2–3 ml) was suspended in each solution and the plutonium concentration in the supernatant monitored by scintillation spectrometry after removing the cells by centrifugation.

TABLE 3

| Solution | Equil. pH | Initial Pu CPM | Final Pu CPM | % Pu removed | Cell Dry Weight (mg) |
|---|---|---|---|---|---|
| J-13 water | 5.5 | 3989 | 624 | 84 | 30.1 |
| control | 3.5 | 3968 | 4064 | | |
| 0.1N HCl | 1.0 | 4296 | 796 | 81 | 25.7 |
| control | 1.0 | 4268 | 4338 | | |
| 0.01M sodium citrate | 5.3 | 4242 | 2642 | 38 | 27.9 |
| control | 5.9 | 4188 | 4190 | | |
| 0.1M Na bicarbonate | 8.0 | 4100 | 634 | 85 | 19.7 |
| control | 8.0 | 4276 | 4110 | | |
| 0.1M Na EDTA | 10.0 | 4136 | 3208 | 22 | 41.4 |
| control | 10.0 | 4052 | 4308 | | |
| 0.01M $Ba(NO_3)_2$ | 5.6 | 4324 | 493 | 89 | 30.4 |
| control | 3.5 | 4198 | 3777 | | |
| J-13 water | 1.1 | 5764 | 1206 | 79 | 32.6 |
| 0.1N HCl | 0.5 | 5371 | 911 | 83 | 35.4 |
| 0.1M Na bicarbonate | 7.5 | 5438 | 2384 | 56 | 20.9 |
| 0.1M Na citrate | 1.3 | 5591 | 931 | 83 | 33.2 |

Control solutions without added cells were used to verify that the Pu(IV) did not form a polymeric species that could be removed from solution by the centrifugation step.

The *D. innoxia* cells (nonviable in these solutions) removed 80–90% of the Pu activity from solution over a wide range (1–8) of pH values. The extent of Pu removal could be higher since some of the α activity is due to americium contained in the original plutonium oxide. Citrate and EDTA, which form very strong complexes with Pu(IV), were found to significantly reduce Pu uptake by the plant cell material. A large excess of Ba did not significantly interfere with Pu uptake. Measurements of the Pu concentration taken after one hour of contact show that the solutions near pH 1 are essentially at equilibrium in this time period, whereas the solutions at higher pH require several hours to reach equilibrium. The longer equilibrium times at higher pH are probably the result of slower ligand exchange kinetics caused by the more strongly complexing ligands needed to keep the Pu(IV) in solution.

Solutions 1–6 (10 ml) were spiked with 50 μl of a solution of $10^{-4}$ M Pu(IV) in 1 N HCl and "final" Pu counts were obtained after 75 hours of shaking with the cellular material. Solutions 7–10 (10 ml) were spiked with 100 ml of $10^{-4}$ M Pu(IV) in 12 N HCl and "final" Pu counts were obtained after 24 hours of shaking with the cellular material. The beginning Pu(IV) concentration was therefore $5 \times 10^{-7} = 500$ nM for the former solutions and 1 μM for the latter solutions.

EXAMPLE III

Iron Removal

Cells were incubated in 0.19 μM $^{59}$Fe (15 μCi) for 24 hours, after which they were harvested by centrifugation from the growing medium, washed twice in a solution containing 10 mM Tris-HCl, pH 7.4, 10 mM $MgCl_2$, 1.5 mM KCl, and 50 mM 2-mercaptoethanol, resuspended in the same solution, and homogenized. It was found that 77.8% of the total $Fe^{2+}$ from the medium containing the iron was sequestered by the cells, with 14.4% found in the soluble fraction of the cell homogenate, and 85.6% in the insoluble components, most likely the cell wall.

EXAMPLE IV

Explosive Removal

Figure 6:
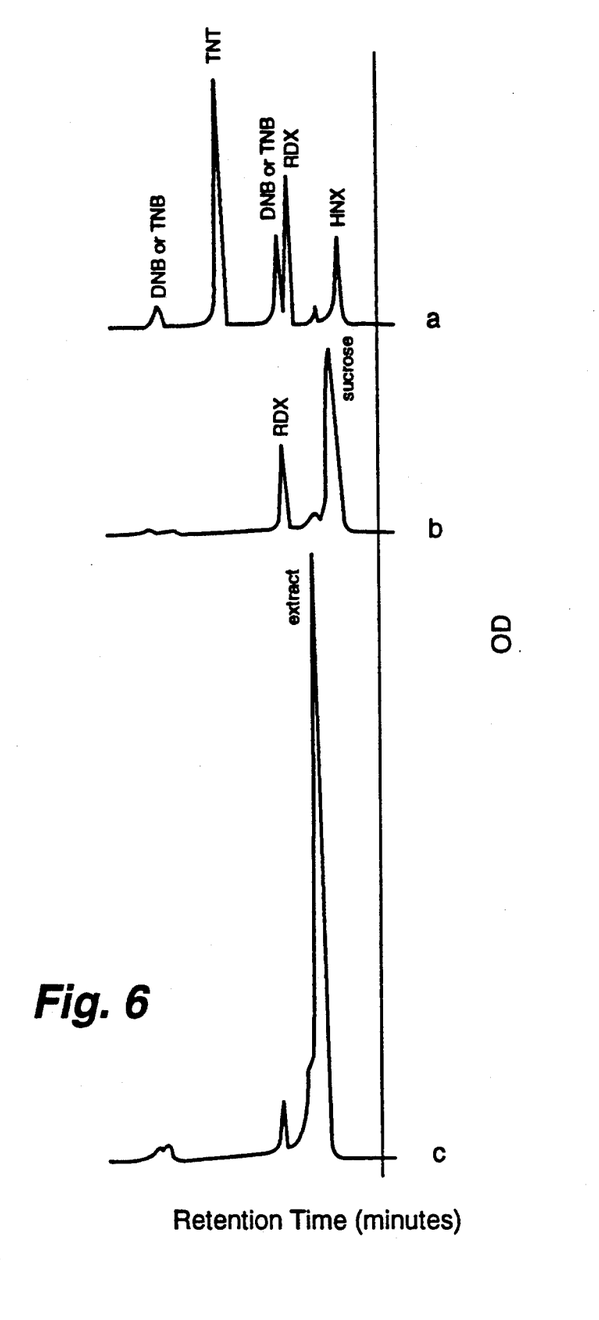

FIG. 6 shows three high pressure liquid chromatography traces (Retention Time (minutes) v. Optical Density at 254 nm) of aqueous solutions containing explosive compounds and some by-products thereof. FIG. 6a is the trace of a typical waste solution containing several explosives and associated compositions. Present are quantities of DNB (dinitrobenzene) or TNB (trinitrobenzene), TNT, RDX, and HMX. FIG. 6b is a chromatographic trace of the solution shown in FIG. 6a after treatment with *D. innoxia* for four hours. FIG. 6c is a chromatographic trace of the soluble portion of an extract from the *D. innoxia* cells used to treat the solution characterized in FIG. 6a. The cell extract was mixed (1:1) with a buffer containing acetonitrile, in which the explosive molecules are very soluble. The large peak with the short retention time in FIG. 6b is the result of sucrose in the plant cell medium. The large peak with essentially the same retention time in FIG. 6c is the result of sucrose and other unidentified material released from the cells during the extraction process. HMX has the same retention time as sucrose. However, independent experiments have demonstrated that at least some of the HMX is removed from solution.

The foregoing description of several preferred embodiments of the invention have been presented for purposes of illustration and description. It is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for reducing the concentration of TNT-related explosives in aqueous solution comprising the steps of adding a suspension of plant cells to the aqueous solution, and separating the plant cells from the solution after sufficient interaction time for the explosives to interact with the plant cells has taken place.

2. The method as described in claim 1, wherein the plant cells are selected from the group consisting of Citrus citrus, Black Mexican sweet corn and *D. innoxia*.

3. The method as described in claim 1, further comprising the step of dehydrating the plant cells before said step of addition to the aqueous solution.

* * * * *